Patented Feb. 8, 1949

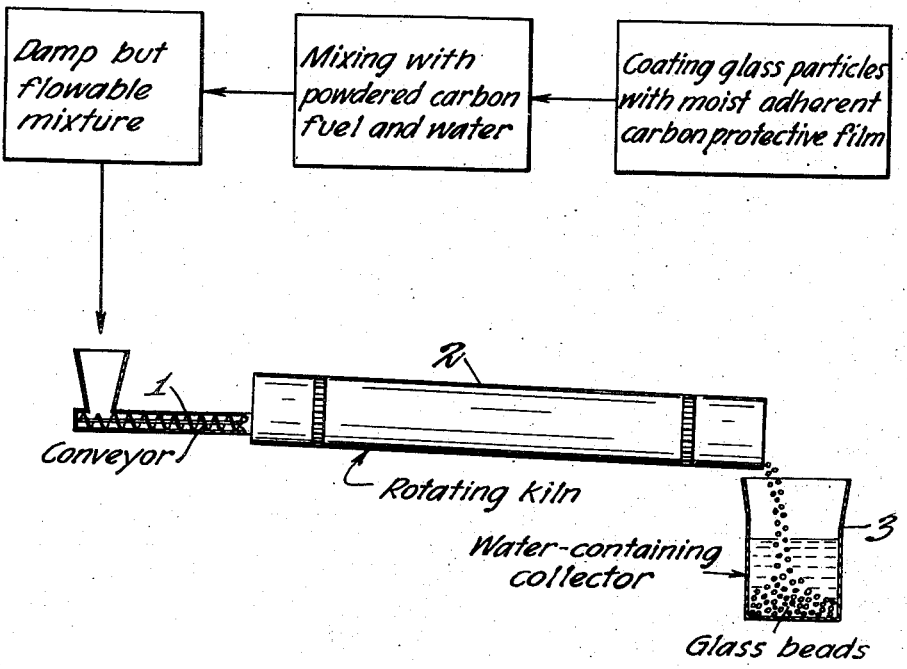

2,461,011

UNITED STATES PATENT OFFICE 2,461,011

CARBON POWDER METHOD OF MAKING GLASS BEADS

Nelson W. Taylor, White Bear Lake, and Robert C. Murray, Bald Eagle Lake, Minn., assignors to Minnesota Mining & Manufacturing Company, St. Paul, Minn., a corporation of Delaware Application August 29, 1945, Serial No. 613,434

8 Claims. (Cl. 49—77)

This invention relates to a method of making small glass spheres, sometimes termed glass spherules, and most commonly referred to in the trade as "glass beads." These glass beads are to be distinguished from hollow beads and beads pierced by holes for stringing or other reasons. Glass beads, by which is here meant small solid spheres, are commercially used in large quantities in many fields. In various decorative applications, use is made of both transparent and opaque glass beads, which are generally colored.

Transparent glass beads are used as sphere-lens optical elements in making motion picture screens, reflex reflecting signs and markers, and reflex reflecting road striping. Especially in the case of reflex reflecting signs and markers, it is desirable that the glass beads be as perfect as possible. Departure from a true sphere shape, lack of surface smoothness and cleanliness, and inclusion of air bubbles, are highly undesirable because of interference with the desired optical qualities. Glass beads for these uses are generally clear and uncolored, but colored transparent beads are sometimes employed.

This invention provides a method by which glass beads can be made having a high degree of perfection, highly suited for exacting optical uses as well as for less exacting uses.

Briefly stated, the present invention involves heating a mixture of glass particles, each of which is coated with a protective film of ash-free carbon, and a small proportion of powdered carbon fuel, so as to cause combustion of the carbon fuel and fusion of the glass particles into non-adhering spheres terminating the heating and combustion to avoid coalescence of the spheres, and then cooling the spheres.

The present method is exemplified by the steps of coating glass cullet particles with ash-free carbon in a finely divided state (such as carbon black or colloidal graphite) to provide an adherent carbon protective film on each glass particle, mixing the carbon-coated glass particles with powdered carbon fuel (such as charcoal fines) in sufficient amount to surround the particles and provide a fuel bed, heating the mixture sufficiently to cause combustion of the carbon fuel and fusion of the glass particles into non-adhering spheres formed by surface tension but insufficiently to burn off the carbon protective coatings, the heating and combustion being controlled to avoid coalescence of the spheres, and then cooling and cleaning the spheres.

This method can be carried out without agitating or moving the glass particles during the formation of spheres, as by using a batch procedure in which the mixture of glass cullet and carbon is placed in a tray or crucible and heated in an oven or furnace, followed by cooling after the spheres have been formed. However, an agitation procedure can also be employed by using a rotary kiln, either of the batch or of the continuous through-put type, in which the heating of the mixture is conducted, so as to cause rolling of spheres as they are formed. In any case, the heating causes partial combustion of the carbon fuel which provides heat in close proximity to the glass particles. The carbon protective films prevent the hot spheres from sticking together; and serve to maintain the newly formed, smooth, spherical glass surfaces, and keep them free from contact with ash material developed in the fuel bed. The protective film is so thin that it does not prevent proper heat transfer to the glass, and yet it is so dense that it does not burn away.

The accompanying drawing is a diagrammatic flow sheet illustrating the continuous kiln procedure briefly described above.

As indicated in the drawing, the glass particles are first provided with a moist adherent carbon protective film. This can be accomplished by mixing the glass particles with a minute proportion of ash-free carbon in a finely divided state (such as carbon black or graphite) and in the presence of water. The coated particles are then mixed with the powdered carbon fuel (such as charcoal fines) and water to provide a damp but flowable mixture. This is continuously introduced by screw conveyor 1 into the inlet end of the rotating kiln 2. The spheres and remaining carbon particles reaching the outlet end fall through air into the water-containing receptacle 3.

The following examples of the present method of making glass beads serve to illustrate the use of a rotary kiln arrangement which can be operated continuously to produce glass beads on a commercial production basis.

The kiln comprised a ceramic tube about 46 inches long, wound on the outside with a resistance ribbon for electrical heating, and having on the inside a stainless steel sleeve of 6 inch inside diameter. To produce a rolling rather than a sliding action of the glass-carbon mixture during processing in the kiln, the inside was lined with a stainless steel sheet having small protuberances. This lining was made by forming electric weld beadings (rounded ridges) about 1½ inches apart on a stainless steel sheet which was then formed into a cylinder and inserted into the steel sleeve and secured in place, the weld beadings extending parallel to the axis. The kiln had a slope of approximately 4° and was rotatably mounted for rotation through gearing by an electric motor. At the inlet end a vibratory feeder was employed for continuously introducing the charging stock at a uniform rate which could be accurately controlled. The outlet end discharged into a vertical air stack, arranged so that the emerging product would fall for about 40 feet through cool air and then into a barrel or other collecting receptacle at the bottom, ready for cleaning. The beads cooled to a hardened state during the first few feet of travel in the stack.

*Example 1*

This example illustrates the use of carbon black to provide the ash-free carbon protective film, and the use of charcoal to provide the powdered carbon fuel. Also illustrated is the simultaneous production of glass beads of different sizes. Three different sets of charging stock proportions are set forth in columns A, B and C of the following table:

|  | Parts by weight | | |
| --- | --- | --- | --- |
|  | A | B | C |
| Glass cullet | 1,000 | 1,000 | 1,000 |
| Carbon black | 6.8 | 5.0 | 7.5 |
| Charcoal fines | 91 | 150 | 175 |
| Water | 12 | 13 | 16 |
| Other data: | | | |
| Pounds per hour of glass fed into kiln | 50 | 45 | 45 |
| R. P. M. of kiln | 32 | 32 | 32 |
| Kiln temperature °F | 1,675 | 1,700 | 1,725–1,750 |

The glass cullet in formula A comprised 910 parts having a grit size ranging from Nos. 24 to 36, 45 parts having a grit size of No. 50, and 45 parts having a grit size of No. 60. The formula B cullet consisted of 500 parts having a grit size ranging from Nos. 24 to 36, and 500 parts of grit size No. 40. The formula C cullet consisted of 300 parts having a grit size ranging from Nos. 24 to 36, and 700 parts having a grit size ranging from Nos. 40 to 60. In terms of bead sizes produced, the grit 24–36 cullet yielded beads of 16 to 46 mils diameter; the grit 40 cullet yielded beads of about 20 mils diameter; the grit 50 cullet yielded beads of about 15 mils diameter; the grit 60 cullet yielded beads of about 9 mils diameter; and the grit 40–60 cullet yielded beads of 9 to 26 mils diameter. The glass cullet was crushed window glass scrap which was graded to size.

In each case the procedure was to place the glass cullet and carbon black in a mixer of the cement mixer type and dry mix for about five minutes so as to thoroughly disperse the carbon black. It will be noted that the proportion by weight of carbon black was very minute. The water was then gradually added and mixing was continued for about five minutes. This resulted in the glass particles each being coated with a thin film of moist carbon black particles. Then the charcoal fines was added and mixing was continued for a few minutes until a uniform mixture was obtained. The water content was so small that the product felt just barely damp to the touch, and would readily flow through the vibratory feeder of the kiln.

The charging stock was introduced into the kiln under the conditions shown in the table; the current in the electrical heating coil being adjusted to produce the specified temperature in the glass-carbon mixture as it neared the outlet of the kiln. The rolling glass-carbon mixture gradually heated up in progressing through the kiln; the charcoal becoming ignited and providing a glowing bed in which the glass particles were distributed. The amount of air entering the kiln was kept low enough so that the glass beads still had a coating of carbon black when discharged from the end of the kiln and the associated charcoal was not quite all consumed.

The cooled glass beads, as taken from the bottom of the air stack, were cleaned by washing with a detergent solution in a mixer of the cement mixer type. This solution had the following formula per 1000 parts of glass beads:

| | Parts by weight |
| --- | --- |
| Glass beads | 1000 |
| Water | 850 |
| Trisodium phosphate | 16 |
| Ammonium chloride | 0.2 |
| Soap | 0.3 |
| Pine oil | 1 |

The mixture of glass beads and detergent solution was brought to a boil by introducing steam and was mixed for five minutes. The solution was decanted off and the beads were rinsed twice with hot water. Another batch of the detergent solution was added and mixing was continued for about half an hour, or until the beads were clean. The solution was decanted off and the beads were rinsed four times with cold water. The clean beads were then removed from the mixer and dried with hot air.

The mass of beads, consisting of different sizes, was then graded to result in beads stocks of different bead sizes.

It will be understood that beads of a particular size can be directly produced by employing a graded cullet of the appropriate grit size. However, since glass cullet as made contains particles of widely varying sizes, it is advantageous to process cullet of mixed sizes in order to reduce the number of runs required for converting cullet into beads. A feature of the present method is the ease and efficiency with which this can be done.

Comparing formulas A and C, it will be noted that the latter contains a much higher proportion of cullet grit sizes which are finer than the 24–36 size, and that the proportions by weight of carbon black and charcoal are greater in C than in A. This is because, in general, it has been found that finer cullet requires more carbon material, probably due to the greater surface area per unit of weight of the finer cullet.

*Example 2*

This example illustrates the use of colloidal graphite instead of carbon black for providing the protective coating on the glass particles. Except as noted, the procedure was the same as in Example 1.

The proportions by weight of glass and carbon material in the charging stock were as follows:

| | Parts by weight |
| --- | --- |
| Glass cullet | 1000 |
| Colloidal graphite (solids) | 0.24 |
| Charcoal fines | 110 |

In this example use was made of a mixture of equal parts by weight of cullet of 24–36 grit size and 40–60 grit size.

The colloidal graphite was in the form of a dispersion in water. Use was made of "Aquadag," an aqueous dispersion containing 22% graphite solids. The "Aquadag" was mixed with a solution of water containing ½% of pine oil, in the proportion of 1 part by weight of "Aquadag" solution to 10 parts of pine oil solution. The resultant graphite dispersion thus contained 2.0% by weight of graphite solids, and 12 parts by weight were used in the above formulation to supply the desired proportions of graphite and water. The pine oil served as a wetting agent to aid in coating the glass cullet particles.

The glass cullet and the graphite dispersion were mixed for 20 minutes in a mixer of the cement-mixer type, resulting in each glass particle being coated with a minute film of colloidal graphite. The charcoal fines was then introduced and mixing continued for 2 or 3 minutes, to provide the carbon fuel in which the coated glass particles were distributed. The product felt just barely damp to the touch and would readily flow through the vibratory feeder of the kiln.

This charging stock was introduced into the kiln at the rate of 55 pounds of glass per hour; the kiln was rotated at 32 R. P. M.; and the current in the electrical heating coil was adjusted to produce a temperature of about 900° C. (1650° F.) in the glass-carbon mixture as it neared the outlet of the kiln.

From the foregoing description of the invention it will be evident that two distinct types of carbon powder are employed.

The first type is the ash-free carbon in a finely divided state used in minute proportion by weight for forming the protective coating on each glass particle. Using an efficient rotary kiln arrangement, it is generally true that less than 10 pounds are required per 1000 pounds of glass beads produced. This type is exemplified by carbon black, and by colloidal graphite. Natural graphites which include appreciable ash-forming material are not included. The manufactured colloidal graphites are of high purity. The individual particles of carbon in carbon black and in colloidal graphite are of submicroscopic size, though they may to a certain extent be agglomerated by cohesion, and permit the formation of extremely thin, dense and tightly adherent film coatings on even small glass particles. These films are sufficiently continuous and dense to provide the desired protective action. The density of the thin coating, due to the close-packing of the particles of carbon, prevents the coating from being burned away in the glowing fuel bed. The glass particles may be given an equivalent carbon protective coating by being coated with an organic compound, such as an organic acid or a starch, of a type which, under non-oxidizing conditions (such as in a carbon fuel bed), decomposes below its boiling point to yield carbon as a product; followed by heating to form the ash-free carbon particle coating in situ on the glass surfaces (as by being heated in admixture with the carbon fuel in the furnace or kiln).

The second type is the powdered carbon fuel which is employed to form the fuel bed in which the carbon-coated glass particles are distributed. Unlike the first type of carbon material, this carbon fuel has an appreciable ash content, and the powder particles are mainly not of sub-microscopic size and hence will form a desirably porous fuel bed having excellent combustion and heat transfer characteristics. A preferred exemplification is powdered charcoal, such as charcoal fines. Other examples are powdered coke (of which petroleum coke and pitch coke are preferred), and powdered anthracite coal. The glass surfaces are protected from the ash formed during combustion of this carbon fuel owing to the action of the previously described carbon protective film. Carbon fuels of high iron oxide ash value should be avoided in order to prevent distillation of iron vapor in sufficient amount to adversely affect the glass.

The proportion of powdered carbon fuel to glass particles may be varied over a wide range. An unduly high proportion will be uneconomical and will prevent proper heating within a reasonable length of time. As a practical matter, it is desirable to use the smallest amount which will produce good beads. The optimum proportion will depend on the particular way in which the method is carried out, the particular fuel, and the size of the glass beads. Using an efficiently designed rotary kiln which is operated continuously, it is generally true that less than 200 pounds of fuel are required per 1000 pounds of glass beads produced. The foregoing examples illustrate suitable proportions which have been found satisfactory for commercial operation of the illustrative described kiln.

The present invention is not limited to any particular kind of glass. Glass beads are generally made from a good quality of scrap glass, such as scrap window glass (which is a soda-lime-silica type). Scrap electric light bulb glass is also an inexpensive raw material of good quality. A heating temperature in the range of about 850–950° C. (about 1550–1750° F.) gives good results with ordinary soda-lime-silica glass. A higher temperature is needed for the glasses of high softening temperature, such as the "Pyrex" type (soda-borosilicate type), but this is not obstacle to the present method. The present method can be used with phosphate glasses. The reducing action of the hot carbon powder will modify reducible glasses and hence the present method is not suitable where such action would produce glass beads of poor quality for a desired use (as in the case of glass of high lead content to be made into beads for optical uses). Colored glass can be used for making colored beads.

The scrap or other raw material glass is pulverized and graded to obtain glass cullet particles of proper size for making the desired size of glass beads. The final beads can also be graded to size. A wide variety of sizes can be made. Glass beads having diameters in the range of about 3 to 60 mils are of chief interest, although smaller and larger beads can be made by the present method. Glass beads in the range of 3 to 10 mils diameter are commonly employed in making reflux reflector sheeting and signs (c. f. U. S. Patent No. 2,354,049, issued July 18, 1944). It is of interest to note that one pound of ordinary glass beads of 10 mils diameter comprises about 20 million beads. A cubic foot will contain about two thousand million (two billion) of such beads. The number is inversely proportional to the cube of the bead diameter.

As previously indicated, the temperature to be used will depend on the particular glass, and for ordinary scrap glass of the soda-lime-silica type will be in the range of about 850–950° C. The temperature must be adequate to result in fusing or melting the glass particles sufficiently so that the force of surface tension can draw each glass particle into a sphere shape. Glass, unlike metals, does not have a sharply defined true "melting point," and by "melting" or "fusion" of the glass particles it is meant that the viscosity is reduced sufficiently to permit the requisite flow needed for sphere formation. The temperature needed is of the order of the temperature to which a fibre of the glass would have to be heated in order to form a droplet on its end. An unnecessarily high temperature should be avoided, as it will increase the consumption of the carbon and, if sufficiently high, will cause the glass particles to flow together and coalesce.

Having described various embodiments of the invention for purposes of illustration rather than limitation, what we claim is as follows:

1. A method of making glass beads comprising heating a mixture of glass particles, each of which is coated with a protective film of ash-free carbon in a finely divided state, and a small proportion of powdered carbon fuel having an appreciable ash content, the heating being sufficient to cause combustion of the carbon fuel and fusion of the glass particles into non-adhering spheres but insufficient to burn off the carbon protective films, terminating the heating and combustion to avoid coalescence of the spheres, and then cooling the spheres.

2. A method according to claim 1 wherein the mixture is heated in a rotary kiln.

3. A method of making glass beads comprising coating glass particles with a minute proportion of ash-free carbon in a finely divided state to provide an adherent carbon protective film on each glass particle, mixing the carbon-coated glass particles with a small proportion of powdered carbon fuel having an appreciable ash content and present in sufficient amount to surround the coated glass particles and provide a fuel bed, heating the mixture sufficiently to cause combustion of the carbon fuel and fusion of the glass particles into non-adhering spheres formed by surface tension but insufficiently to burn off the carbon protective films, terminating the heating and combustion to avoid coalescence of the spheres, and then cooling the spheres.

4. A method according to claim 3 wherein the carbon coating on the glass particles comprises carbon black.

5. A method according to claim 3 wherein the glass particles are dry-mixed with a minute proportion of carbon black and then moistened and further mixed to form the adherent carbon protective film on each glass particle, prior to mixing with the powdered carbon fuel.

6. A method according to claim 3 wherein the carbon coating on the glass particles comprises colloidal graphite.

7. A method according to claim 3 wherein the glass particles are coated with an aqueous dispersion of colloidal graphite to form the adherent carbon protective film on each glass particle, prior to mixing with the powdered carbon fuel.

8. A method of making glass beads comprising coating glass particles with a minute proportion of ash-free carbon in a finely divided state and water to provide an adherent carbon protective film on each glass particle, mixing the carbon-coated glass particles in the presence of water with a small proportion of powdered carbon fuel having an appreciable ash content and present in sufficient amount to surround the glass particles and provide a fuel bed, the water being in limited amount to provide a slightly damp but flowable mixture, continuously introducing the mixture into the inlet end of a rotating sloping kiln, heating the mixture as it progresses through the kiln sufficiently to cause combustion of the carbon fuel and fusion of the glass particles into non-adhering spheres formed by surface tension but insufficiently to burn off the carbon protective films, the heating and combustion being controlled to avoid coalescence of the spheres, and allowing the product to pass from the outlet end of the kiln through air to a collector and thereby cooling the spheres sufficiently in transit to harden them.

NELSON W. TAYLOR.
ROBERT C. MURRAY.

REFERENCES CITED

The following references are of record in the file of this patent:

UNITED STATES PATENTS

| Number | Name | Date |
| --- | --- | --- |
| 2,123,536 | Long | July 12, 1938 |
| 2,332,361 | Anastor et al. | Oct. 19, 1943 |